E. HUBE.
FRUIT PICKER.
APPLICATION FILED APR. 13, 1911.

1,008,470.

Patented Nov. 14, 1911.

WITNESSES:
O. E. Murray.
B. N. Rollins

INVENTOR
Erich Hube
BY Max A. Schmidt
Attorney

UNITED STATES PATENT OFFICE.

ERICH HUBE, OF HAMLIN, NEW YORK.

FRUIT-PICKER.

1,008,470.

Specification of Letters Patent.  Patented Nov. 14, 1911.

Application filed April 13, 1911. Serial No. 620,852.

*To all whom it may concern:*

Be it known that I, ERICH HUBE, a subject of the Emperor of Germany, residing at Hamlin, in the county of Monroe and State of New York, have invented certain new and useful Improvements in Fruit-Pickers, of which the following is a specification.

This invention has reference to devices for picking apples and other fruit, it being designed for reaching fruit which would otherwise be inaccessible.

It is the object of the present invention to provide a device of the kind stated which is simple in construction and easily handled, and which picks the fruit without danger of bruising the same.

Figure 1:
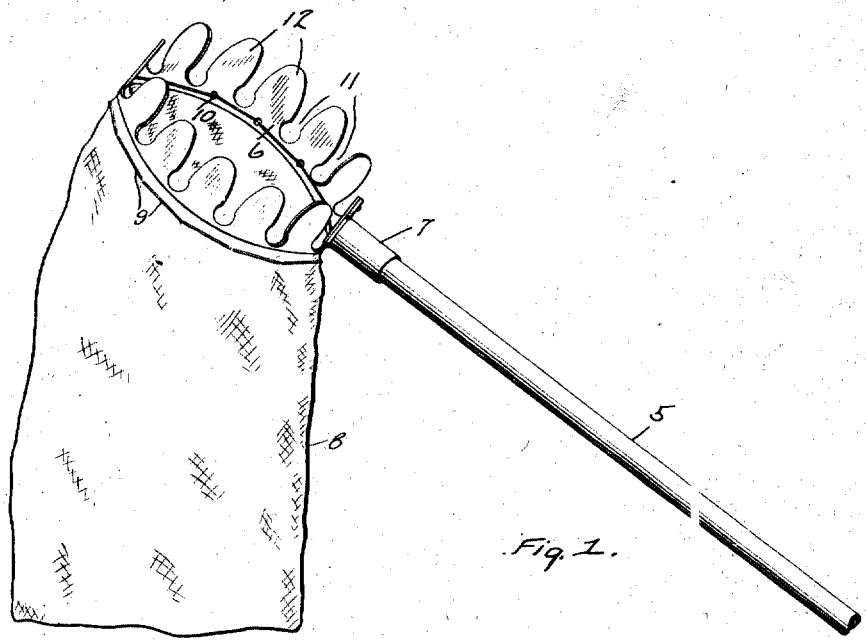
Figure 2:
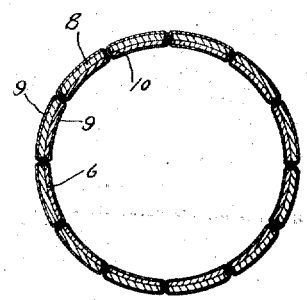

In the accompanying drawing forming a part of this specification—Figure 1 is a perspective view of the device. Fig. 2 is a sectional detail showing the means for securing the fruit-holding receptacle to the picker.

Referring specifically to the drawing, 5 denotes the handle which is a pole of any desired length, at the outer end of which the picker is carried. The picker comprises an annular band 6 of stout sheet metal to which is secured a socket piece 7 for attachment of the band to the pole 5. Secured to the band, so as to depend from the bottom edge therefrom, is a receptacle 8 in the shape of a bag to receive the fruit, said bag being made of canvas or some other suitable fabric. The bag is fastened to the band by two cords 9 which are passed through the fabric and through perforations 10, made in the band near its lower edge. The cords are passed through the perforations so as to extend alternately along the inner surface of the band and the outside of the bag near its mouth. This provides a fastening which securely holds the bag and which can be readily removed if the bag has to be taken off for repair or renewal. The ends of the cords are made fast in any suitable manner.

The top edge of the band 6 is formed with a continuous series of downwardly extending recesses 11 forming upstanding tongues 12. The outer ends of the tongues are rounded off as shown, and the edge of the band between the tongues is substantially semi-circular. The adjacent edges of the tongues which form the side walls of the recesses are curved divergingly from the semi-circular edge in the direction of the outer ends of the tongues whereby the recesses are flared so as to facilitate the entry of the stem of the fruit therebetween.

In use, the picker is guided to the fruit by the pole, and the latter is manipulated so as to bring the stem of the fruit into any one of the recesses 11. A pull on the pole separates the stem from the limb of the tree and the fruit drops into the bag 8. The shape of the recesses effectually prevents injury to the fruit. It will also be noted in Fig. 1 that the recesses extend inwardly to within a short distance from the bottom edge of the band, so that when the fruit is being picked it is brought in contact with the inside of the bag, and any pressure brought to bear on the fruit will not bruise the same.

I claim:

A fruit picker comprising a handle, an annular band carried thereby, said band having its upper edge recessed, said recesses extending into close proximity to the lower edge of the band and forming a continuous series of upstanding tongues having rounded outer ends, the edge of the band between the tongues being blunt and substantially semi-circular, and the adjacent edges of the tongues forming the side walls of the recesses being divergingly curved from said semi-circular edge, and a bag carried by the band and extending from the lower edge thereof free from the handle, the mouth of the bag being coextensive with the circumference of the band.

In testimony whereof I affix my signature in presence of two witnesses.

ERICH HUBE.

Witnesses:
ARTHUR GASCOIGN,
LOUISE E. CATE